United States Patent [19]

Ducrot et al.

[11] Patent Number: 4,988,041
[45] Date of Patent: Jan. 29, 1991

[54] METHOD AND APPARATUS FOR WATERING CULTIVATED LAND, PROVIDING A PROTECTION FOR CULTIVATED PLANTS

[76] Inventors: Jean L. Ducrot, Kechiloa, R.N. 10, 64122 Urrugne; Ayme' de la Chevreliere, Gournay, F 79110, Chef-Boutonne, both of France

[21] Appl. No.: 280,169

[22] Filed: Dec. 5, 1988

[30] Foreign Application Priority Data

Dec. 9, 1987 [FR] France .................................. 87 17145

[51] Int. Cl.$^5$ ............................................. A01G 13/00
[52] U.S. Cl. ..................................... 239/2.1; 239/67; 239/69; 239/136; 137/79; 137/80; 47/2
[58] Field of Search ............... 137/78.1, 79, 78.5, 137/80, 78.2; 239/63, 64, 67, 69, 128, 2.1, 136; 47/2

[56] References Cited

U.S. PATENT DOCUMENTS

| | | | |
|---|---|---|---|
| 3,463,396 | 8/1969 | Borel | 239/63 |
| 3,991,939 | 11/1976 | Maclay | 239/63 |
| 4,039,144 | 8/1977 | Mee | 239/2.1 |
| 4,085,543 | 4/1978 | Barnard | 47/2 |
| 4,209,131 | 6/1980 | Barash et al. | 239/69 |
| 4,333,490 | 6/1982 | Enter, Sr. | 137/80 |
| 4,548,225 | 10/1985 | Busalacchi | 239/64 |
| 4,642,938 | 2/1987 | Georges et al. | 47/2 |
| 4,742,643 | 5/1988 | Thompson, Jr. | 47/2 |
| 4,763,440 | 8/1988 | James | 47/2 |

FOREIGN PATENT DOCUMENTS

| | | | |
|---|---|---|---|
| 3238073 | 1/1983 | Fed. Rep. of Germany | 239/64 |
| 8001032 | 5/1980 | World Int. Prop. O. | 47/2 |

Primary Examiner—Andres Kashnikow
Assistant Examiner—Christopher G. Trainor
Attorney, Agent, or Firm—Duckworth, Allen, Dyer & Doppelt

[57] ABSTRACT

Method and apparatus for protecting plants against the effects of a drop in ambient temperature by causing the formation and preservation of dew or rime, according to the circumstances. The apparatus comprises a "dew box" which measures the ambient temperature and the dew point temperature, a set of comparators for triggering the start of spraying and the start of water heating as a function of ambient temperature, and a control system, including a calculating device, for regulating the temperature of the spraying water.

9 Claims, 3 Drawing Sheets

METHOD AND APPARATUS FOR WATERING CULTIVATED LAND, PROVIDING A PROTECTION FOR CULTIVATED PLANTS

This invention relates to a method for watering plantations, agricultural lands and the like, providing a protection for cultivated plants when ambient conditions in the surrounding atmosphere are inadequate.

BACKGROUND OF THE INVENTION

It has been known for many years that when rime forms on cultivated plants at the moment when ambient temperature reaches 0° C., these plants are then protected against frost by the rime layer. In fact, the formation of rime on the plant prevents radiation from the plant leaves and the heat loss thereof, through a white body effect.

However, when the dew point is zero 0° C. or less than zero, frost occurs before the plant is covered with dew. Rime will therefore not form, and the plant will further radiate its heat content away when the ambient temperature reaches 0° C. and below. The plant will then freeze.

In order to prevent cultivated plants from freezing in such a case, a current practice is to spray them with water when the temperature is nearing 0° C., so as to obtain the protecting rime when the temperature reaches 0° C.

This implies a continuous monitoring of the evolution of the local weather, particularly of the ambient temperature and of the dew point, during periods when frost may possibly occur, and it further implies that spraying should be initiated at the appropriate time by the farmer.

Another problem also arises with plants for which the reproduction temperature is largely above the freezing temperature. For instance, in banana tree plantations, growth and reproduction of bananas no longer takes place after the ambient temperature has dropped below 16° C.

In countries where this is likely to occur, there will be no crop if, at the reproduction time, temperature has dropped below the 16° C. threshold.

This invention aims at overcoming these drawbacks by providing a method for automatically maintaining, through a constant monitoring of local weather conditions, on the one hand the dew point at an acceptable value for rime to form on the plants at the time of frost occurrence, and on the other hand, more particularly in cases in which temperature should not drop below a certain determined value according to the kind of plants cultivated, a micro-climate presenting the required qualities for facilitating the reproduction and growth of plants, and more particularly a formation of dew.

DESCRIPTION OF THE INVENTION

According to this invention, the above-stated purpose is achieved through a method for watering agricultural cultivated land and the like, in which use is made of spray devices to which water is fed through a piping system. The devices produce a fine spray and are distributed evenly through the areas which are to be protected in order to irrigate the whole of these areas. In accordance with the method, the exterior temperature, the dew point and the wind, are measured use is made of the measured values of ambient temperature and dew point for generating on the one hand a first signal transmitted to a device which initiates watering, and on the other hand a second signal which will, when ambient temperature drops below a predetermined value, initiate a reheating of the water and a regulation of water temperature as a function of the wind and of the deviation between the measured and the prescribed dew points in order to raise and maintain the dew point above a predetermined value until the ambient temperature drops below this dew point. In that case the watering operation and the water heating are continued to maintain the water saturation of the air, in order to obtain throughout the plantation and up to a determined height an atmosphere, the dew point temperature of which ensures the protection of the cultivated plants against the effects of a drop of ambient temperature below a determined value, through the formation and conservation of dew and—if the case arises—of rime.

The invention will be better understood with the help of an example of an embodiment of the method and of the device for carrying out this method, which will be described hereinafter.

DETAILED DESCRIPTION OF THE INVENTION

As stated hereinabove, the method of the invention consists in creating a micro-climate presenting favorable conditions for the protection of plants and for their reproduction. To achieve this purpose, it will be needed to evaporate some water, and the evaporation heat will be taken from the water, which is warmer than the ambient air.

Figure 1:
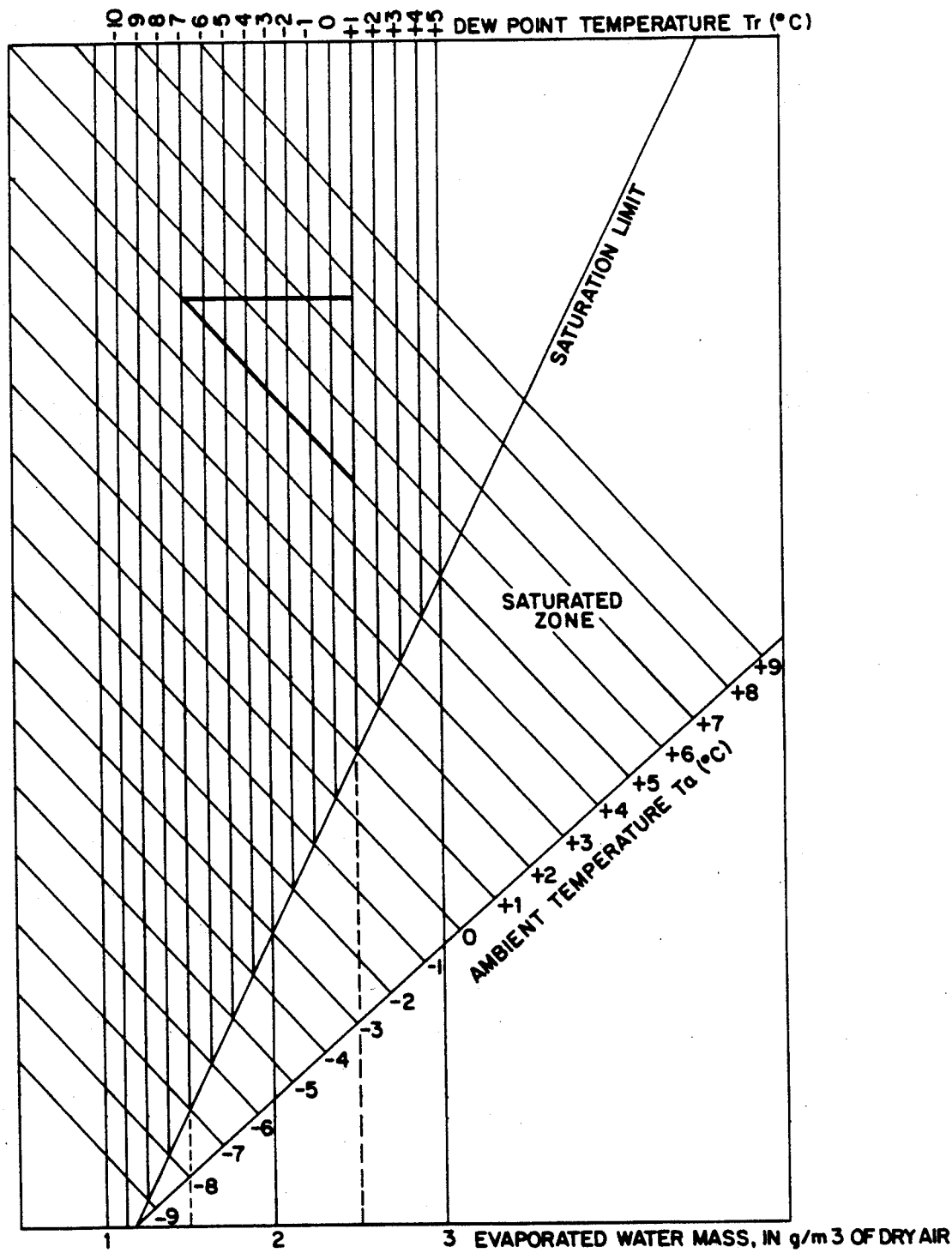
FIG. 1 shows a diagram similar to a Mollier diagram, in which are shown horizontally, above, the dew point temperature and below, the mass of water evaporated, per volume of air considered.

The diagram of FIG. 1 makes it possible to determine the mass of water to be evaporated, per cubic meter of air, for bringing the dew point to an acceptable value.

On the diagram are plotted horizontally, above, the dew point temperature, and below the mass of water to be evaporated in grams per $m^3$ of dry air. The slanted lines represent a value of the ambient temperature in ° C.

Assume that the ambient temperature Ta is +5° C. and that the dew point temperature Tr is −7° C.

The point on the diagram corresponding to this situation is determined by the intersection of the line corresponding to Ta= +5° C. with the line corresponding to Tr= −7° C.

It is desired to bring the dew point temperature Tr to a value being acceptable for the protection of the plant, for instance Trc= +1° C.

The ambient temperature remaining constant, the straight line corresponding to Ta= +5° C. will be followed up to the intersection of this line with the straight line corresponding to $Tr = +1°$ C. There will then be read on the lower horizontal scale of the diagram the value of the water mass to be evaporated per m³ of dry air, which is, in this case, approximately 1 g.

When the dew point temperature Tr is equal to 1° C., and Ta drops below 1° C., evaporated water will condense upon the leaves (dew) or will form a fog, releasing the evaporation heat taken from the spraying water, this heat being approximately 600 calories per gram. If then temperature Ta drops below 0° C., rime will form, releasing the freezing heat.

The plant will thus receive a twofold protection against frost, on the one hand by the layer of dew—or, better still, rime—which prevents radiation from the leaves (white body effect) and on the other hand by the supply of condensation heat and freezing heat released by the water upon the formation of dew at first, and of rime later.

As determined with the help of the diagram, the amount of water which must be evaporated is 1 g per cubic meter of air. If it is desired, in this example, to protect the plantation over a height of 3 m and an area of 1 ha (10,000 m²), the volume to be protected is $3 \times 10,000$ m² = 30,000 m³, which means that 30,000 g (30 liters) of water will have to be evaporated.

For obtaining this evaporation, it will be needed to extract the evaporation heat from the water, which is warmer than the air. Now, for a dew point temperature of 0° C., an amount of 3,750 liters of water at 15° C. will give $3,750 \times 15 = 56,250$ kcal, that is 235,125 KJ. For evaporating 30 liters, we would need $30,000 \text{ g} \times 0.6$ kcal = 18,000 kcal or 75,240 KJ.

If watering is made at the rate of 3,750 liters/ha/hour, there is obtained a theoretical minimum temperature of the spraying water which is 18,000 kcal ÷ 3,750 liters = 4.8° C. for obtaining the heat required for evaporating 30 liters of water by bringing down to 0° C. the temperature of the 3,750 liters. The preceding calculations make it possible to set out the following Table which provides a method for determining the water temperature and the duration of spraying. A "dew box", that is a device indicating the ambient temperature Ta and the dew point Tr, will give the dew point temperature Tr. This temperature Tr will then be raised to the prescribed value Trc by evaporating a determined mass of water having a determined temperature Tw during a time t determined with the help of the Table, according to how fast the dew point must be raised for compensating the heat losses caused by the wind.

The smaller values of wind velocity considered in the Table are due to natural or artificial windbreakers.

TABLE

TABLE FOR DETERMINING THE SPRAYING WATER TEMPERATURE Tw AND THE DURATION OF SPRAYING

SPRAYING WATER TEMPERATURE Tw IN °C. FOR A FEED RATE OF 3,750 LITERS/HOUR

| Trc - Tr (°C.) | Water: g/m³ air | Liters/ha/ 3 meters | Required heat, in kJ | Wind:nil Tr rise in 1 hr | Wind:50 m/s Tr rise in 30 min | Wind:50 m/s Tr rise in 15 min | Wind:50 m/s Tr rise in 8 min | Wind:50 m/s Tr rise in 4 min |
|---|---|---|---|---|---|---|---|---|
| 1 | 0.143 | 4.29 | 10,760 | 0.7° C. | 1.4° C. | 2.8° C. | 5.6° C. | 11.2° C. |
| 2 | 0.285 | 8.57 | 21,494 | 1.4 | 2.8 | 5.6 | 11.2 | 22.4 |
| 3 | 0.429 | 12.85 | 32,228 | 2.1 | 4.2 | 8.4 | 16.8 | 33.6 |
| 4 | 0.571 | 17.14 | 42,987 | 2.7 | 5.4 | 10.8 | 21.6 | 43.2 |
| 5 | 0.714 | 21.43 | 53,746 | 3.4 | 6.8 | 13.6 | 27.2 | 54.4 |
| 6 | 0.857 | 27.51 | 64,481 | 4 | 8.2 | 16.4 | 32.8 | 65.5 |
| 7 | 1 | 30.00 | 75,240 | 4.8 | 9.6 | 19.2 | 38.4 | 76.8 |
| 8 | 1.143 | 34.29 | 85,999 | 5.5 | 11 | 22 | 44.0 | |
| 9 | 1.285 | 38.57 | 96,734 | 6.2 | 12.4 | 24.8 | 49.6 | |
| 10 | 1.429 | 42.86 | 107,493 | 6.9 | 13.8 | 27.6 | 55.2 | |
| 11 | 1.591 | 47.14 | 118,227 | 7.6 | 15.2 | 30.4 | 60.8 | |
| 12 | 1.714 | 51.42 | 128,961 | 8.2 | 16.4 | 32.8 | 65.6 | |
| 13 | 1.857 | 55.71 | 139,721 | 8.9 | 17.8 | 35.6 | | |
| 14 | 2.000 | 60.00 | 150,480 | 9.6 | 19.2 | 38.4 | | |
| 15 | 2.143 | 64.29 | 161,239 | 10.3 | 20.6 | 41.2 | | |

Note:
Trc = set value of dew point
Tr = dew point actual

Spraying will be carried out by means of appropriate devices provided for this purpose, and will be repeated periodically so as to compensate heat losses and moisture losses due to the environment and to the wind, for keeping constant the micro-climate which has been obtained.

EXAMPLE

The "dew box" is indicating a dew point temperature of −6° C. For obtaining a Tr temperature of +1° C., a difference of 7° C. will need to be compensated.

For this, it will be needed to evaporate approximately 1 g of water per m³ of air, that is 30 liters per hectare, over a height of 3 m. This corresponds to 75,240 kJ (18,000 kcal). If it is planned to raise the dew point to 1° C. within 1 hour, the water temperature will need to be at least 4.8° C.

For taking the wind effect into account, it will for instance be necessary to renovate the micro-climate being thus created, at regular intervals of eight minutes.

For obtaining the required calories, the Table indicates that water temperature at the spraying nozzles should be 38.4° C.

The procedure for implementing the above-described method will therefore consist, in order to save water heating costs, to start spraying with cold water when Ta drops, for instance, to +5° C., and then to activate the heating of water when Ta has dropped to +2° C. in order to raise the dew point temperature to +1° C.

Thus, when ambient temperature Ta will pass through Ta=Tr=1° C., condensation and the formation of rime will occur at Ta=0° C.

In the above Example, the method has been used for protecting plants against frost. In the case of plants which require a relatively warmer temperature, either for their reproduction or for their growth or other purposes, a temperature Ta1 is set, at which spraying will be started, as previously, for instance at 4° C. above the temperature To below which it should not be allowed to drop, and then a temperature Ta2 is set, starting from which water will be heated at 1° C. above To.

For bananas, for instance, Ta will be set at 16° C., Ta1 at 20° C. and Ta2 at 17° C.

Figure 2:
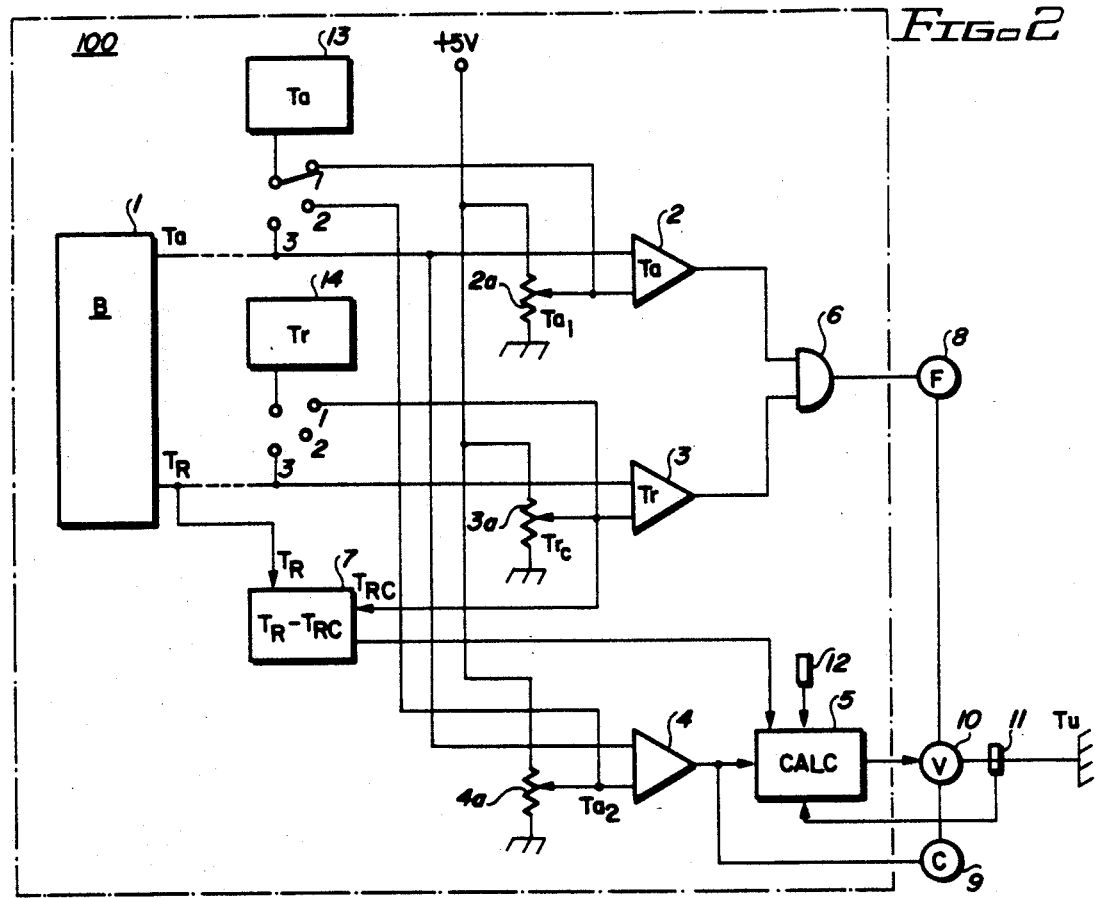
FIG. 2 shows a theoretical diagram of a watering system according to this invention, in the case where water temperature is regulated by means of a mixer valve.

An example of the apparatus for carrying out the method of the invention is shown in FIG. 2.

A "dew box" 1, preferably located in the plantation, measures the ambient temperature Ta and the dew point temperature Tr. These values are converted respectively into signals transmitted to inputs in comparators 2, 3 and 4. Signal Ta representing the ambient temperature is fed to one input of comparator 2 and to one input of comparator 4. In comparator 2, signal Ta will be compared with a first external temperature value Ta1, known as the warning value, corresponding to the ambient temperature below which spraying would need to be started. This warning temperature Ta1 is predetermined by means of potentiometer 2a and fed to the second input of comparator 2. In comparator 4, Ta will be compared to a second prescribed value Ta2 of ambient temperature, below which spraying water will need to be warmed. This value Ta2 is set by means of potentiometer 4a and is fed to the second input of comparator 4.

Signal Tr representing the dew point temperature measured by the "dew box" 1 is fed to the first input of comparator 3 where it is compared to a prescribed dew point value Trc which is set by means of potentiometer 3a and is fed to the second input of comparator 3. The outputs of comparators 2 and 3 are connected to the inputs of AND gate 6, the output of which is connected to a system for actuating a cold water feed valve 8.

The output of comparator 4 is connected, on the one hand to the control system of a hot water valve 9, and on the other hand to a calculating device 5, the output signal of which is transmitted to the control unit of a mixer valve 10 connected to the feed lines of the spray nozzles.

The calculating device 5 determines the setting of the mixer valve 10 as a function of the temperature Tw of the sprayed water, as measured by a probe 11 on the outlet of valve 10, as a function of the wind velocity measured by an anemometer 12, and of the difference between the measured value Tr of the dew point and the prescribed value Trc for the dew point, this difference being calculated by a comparator 7.

A visual display 13 is provided for showing, in position 1 the warning temperature value Ta1, in position 2 the value of the temperature Ta2 at which heating will be started, and in position 3 the actual ambient temperature Ta.

Another display 14 shows, in position 1 the prescribed dew point value Trc and in position 3 the actual dew point temperature Tr.

The system operates as follows:

The warning temperature Ta1 having first been set at +5° C. by means of potentiometer 2a, the prescribed dew point temperature having been set at +1° C. on potentiometer 3a, and the temperature Ta2 at which heating should start having been set at +2° C. on potentiometer 4a (these values being indicated here by way of example only), signal Ta issuing from the "dew box" 1 is compared with value Ta1 in comparator 2 and, in the same time, signal Tr also coming from the dew box is compared with the prescribed value Trc in comparator 3. The signals delivered by comparators 2 and 3 are fed to the AND gate 6 which will let no signal pass through as long as its two inputs are not activated. When the measured temperature Ta is equal to or less than the set warning temperature Ta1 = +5° C., comparator 2 will activate the first input of the AND gate 6. As long as Tr lies above the comparative value Trc in comparator 3, the second input of the AND gate is not activated. When Tr drops down to the prescribed Trc value, namely +1° C., comparator 3 activates the second input of the AND gate 6 and valve 8 controlling the spraying with cold water is opened. Spraying is continued with cold water until the ambient temperature Ta reaches the value Ta2 = +2° C. Comparator 4 will then trigger the starting up of the boiler and the opening of the hot water valve 9. Simultaneously, the calculating device 5 will regulate the sprayed water temperature by controlling the mixer valve 10 as a function of the temperature difference between the measured dew point and the prescribed dew point, and of the wind velocity, for the upkeep of the micro-climate, and it will regulate the position of this valve, taking into account the effective temperature Tw of the spraying water.

Instead of using a mixer valve 10, the system may be provided with a control device for controlling the positions of the hot water valve 9 and cold water valve 8. These two valves 8, 9 are actuated in opposite directions, one in the opening direction and the other in the closing direction, so as to obtain the desired temperature of the spraying water.

Figure 3:
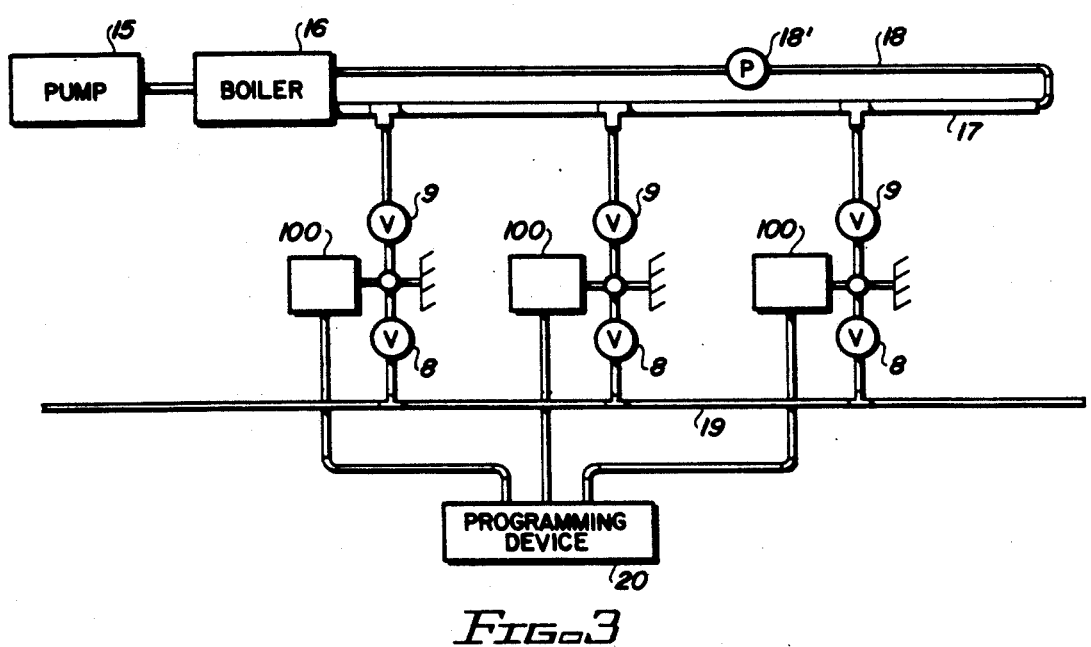
FIG. 3 shows an installation equipped with several systems according to the invention.

FIG. 3 represents a watering installation comprising several devices according to this invention.

Hot water is fed to the hot water valves 9 from a boiler 16 through a main line 17, the water being pressurized by a pump 15. In order to keep the temperature of the spraying water steady as much as possible, unused water from main line 17 is recycled to the boiler through a return line 18 and a pump 18'. This avoids a temperature drop of the water reaching the valves 9, more particularly those valves which lie further away from the boiler.

Cold water is fed through a line 19 to the cold water valves 8.

Each one of the devices 100 according to the invention comprises a "dew box" 1 and the other components shown on FIG. 2 are distributed through the plantation so as to ensure a complete spraying of the whole area. Each dew box will serve for the local regulation of the water temperature.

In case the available flow rate of water is limited, a programming device 20 is provided for allowing the various systems 100 to operate in succession, so that a sequential watering is obtained.

According to another embodiment of the invention, the modulation of the temperature Tw of the spraying water is no longer effected by a mixer valve 10 receiving cold water and hot water. It is now effected by a direct control of the boiler 16 by the device 100 which also controls the valves of the spraying devices.

Figure 4:
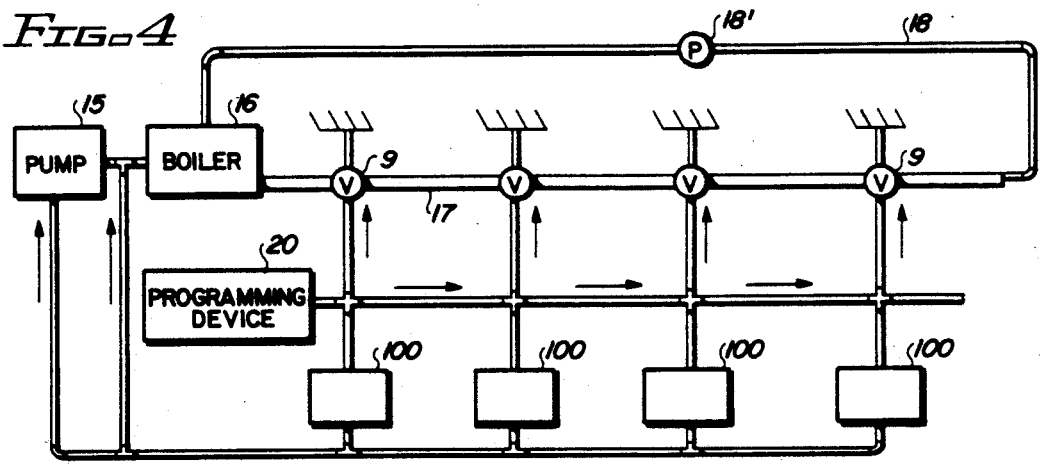
FIG. 4 shows a second form of utilization of the system according to the invention.
Figure 5:
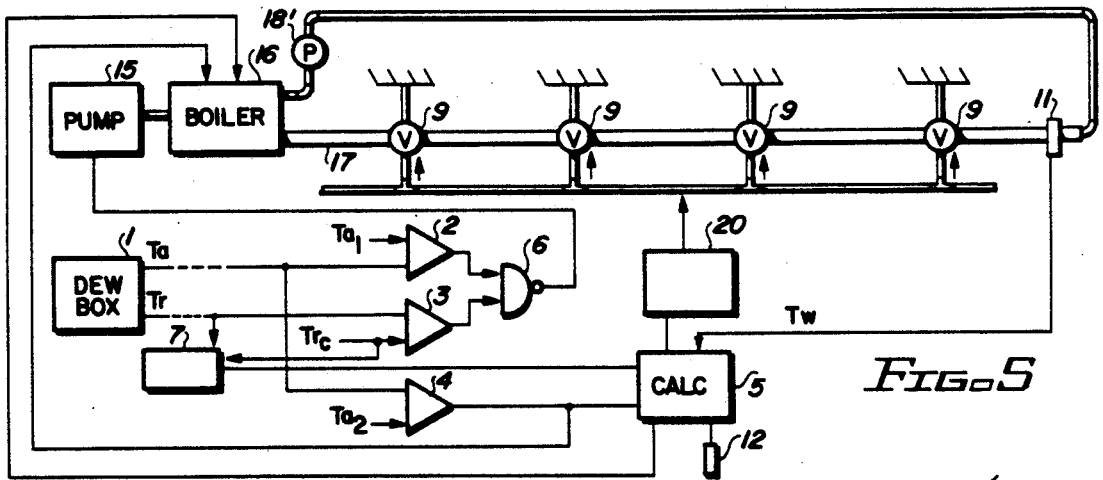
FIG. 5 shows a diagram of the second embodiment of the invention.

One such device is represented in FIGS. 4 and 5. A single feed line 17 supplies water from the boiler 16. When Ta = Ta1, the system starts the pump 15. This water is not heated, as long as Ta lies between Ta1 and Ta2. As soon as Ta reaches Ta2 as it drops, the system starts the heating of water and controls a thermostatic regulation of the boiler 16 by means of the calculating device 5. A programming device 20 controls the sequential opening of the valves 9. In order to keep the size of the equipment within economical limits (particularly in respect of flow rate), spraying will be carried out sequentially from one strip of land to the next. The calculating device 5 of the system will control sequentially the opening and closing of valves 9 in each spraying sector, according to a determined rythm.

Figure 6:
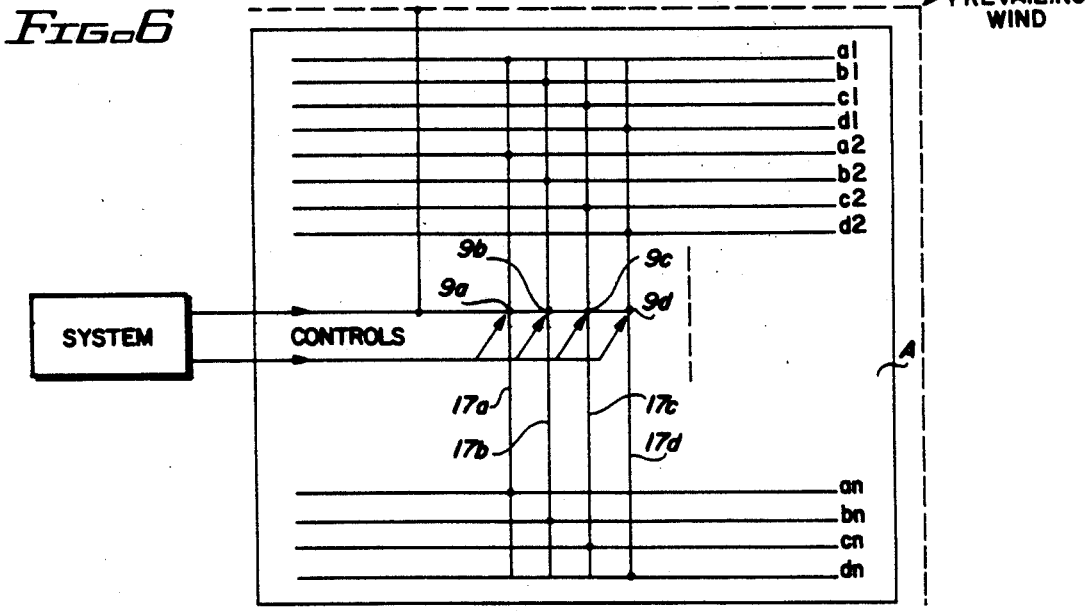
FIG. 6 shows an application of the device according to the invention.

An example of an application of the invention will be described hereinafter, with the help of FIG. 6.

Over a cultivated area A, the spraying devices are disposed in parallel rows, groups of rows being supplied by four feed lines 17a, 17b, 17c and 17d. For an even distribution of spraying, the rows connected to one given line are interpolated with those connected to the other lines. Thus, row a1 is followed by rows b1, c1 and d1, and then a2, b2, c2, d2 etc.

Lines 17a–17d are fitted with valves 9a–9d, the opening and closing of which are controlled sequentially by the system. The system will modulate the temperature of the water reaching the valves 9a–9d, either through thermostatic regulation of the boiler, or else by means of a mixer valve located near the valves 9.

In order to avoid heat losses due to the wind, those sides of the area A which are exposed to the prevailing wind are equipped with sprayers being fed continuously through one or several feed lines, and, if required, windbreakers will be erected on those sides.

The calculating device 5 of the system will control spraying sequentially. At first, line 17a and the rows of sprayers a1, a2, a3, a4, . . . an will be fed by opening valve 9a. Thereupon, valve 9a is closed, and rows b1, b2, b3, etc. will be fed by opening valve 9b, and so on to valve 9n. After closing the last valve, i.e. 9n, valve 9a will be opened again and a new cycle will start.

During the cycle, the sprayers located on the two sides of the cultivated area which are exposed to the prevailing wind will operate permanently. The microclimate created is thus preserved.

Two embodiments of the invention have now been described, namely one operating with a mixer valve for mixing hot water with cold water, said mixer valve being controlled for regulating the water temperature, while the other embodiment works through a direct control of the boiler for regulating the water temperature.

It is also possible to envision a modulation of the spraying time while maintaining a constant and relatively high water temperature. The calculating device 5 will then determine watering periods instead of temperatures, in order to provide the same thermal power output.

What is claimed is:

1. A method for watering agricultural crops and the like, in which use is made of spraying devices supplied with water through a piping system and producing a fine spray, distributed evenly over an area to be protected so as to irrigate the whole extent of the area, and in which measurements are made of ambient temperature and of dew point temperature, characterized in that the measured values of the ambient temperature and the dew point temperature are used for producing a first signal which is transmitted to a device initiating watering and a second signal which, upon the ambient temperature having dropped down to a predetermined temperature, will initiate a warming-up of the water and activate a regulation of the water temperature as a function of the deviation between the measured dew point temperature and a prescribed dew point temperature for raising and maintaining the dew point temperature above a predetermined value until the ambient temperature will have dropped below said prescribed dew point temperature, in which case the spraying and warming-up of the water will be maintained in order to obtain throughout the plantation and up to a determined height an atmosphere having a dew point temperature which ensures protection of the crops against the effects of an ambient temperature drop below a determined value, by creating and maintaining dew and rime.

2. A watering method according to claim 1 characterized in that the regulation of the temperature of the water being sprayed is carried out also as a function of wind velocity.

3. A method according to claims 1 or 2, characterized in that the regulation of the temperature of the water being sprayed is carried out also as a function of soil temperature.

4. A watering device for agricultural crops comprising:
   a "dew box" for measuring ambient temperature and dew point temperature;
   a set of comparators for initiating a spraying operation and a warming-up of water to be sprayed as a function of predetermined values of the ambient temperature and of the dew point temperature; and
   means for regulating the temperature of the water to be sprayed as a function of the difference between the measured dew point temperature and the prescribed dew point temperature, and as a function of the temperature of the water itself.

5. A watering device according to claim 4 characterized in that the regulating means takes into account wind velocity measured by a wind gauge for regulating the temperature of the spraying water.

6. A device according to claims 4 or 5, characterized in that the regulating means takes into account soil temperature as measured by means of a probe.

7. A device according to any one of claims 4 or 5 characterized in that the regulating means includes means acting upon at least one cold water valve for starting up the spraying operation, upon at least one warm water valve for feeding warm water to be sprayed, and upon at least one mixer valve for adjusting the mixing of warm water with cold water in order to regulate the temperature of the spraying water.

8. A device according to any one of claims 4 or 5 characterized in that the regulating means includes means acting upon at least one cold water valve for starting up the spraying operation, or upon at least one warm water valve for feeding warm water to be sprayed, while controlling the position of the cold water valves and the warm water valves in opposite directions for adjusting the mixing of warm water with cold water in order to regulate the temperature of the spraying water.

9. A device according to any one of claims 4 or 5 characterized in that the regulating means includes means controlling the spraying operation by acting upon a pump and controlling the water heating by acting directly upon a boiler.

* * * * *